United States Patent [19]

Huey

[11] 3,952,757
[45] Apr. 27, 1976

[54] ROTARY PROCESSING APPARATUS

[76] Inventor: John A. Huey, 830-84th Ave. NE., Bellevue, Wash. 98004

[22] Filed: Mar. 19, 1974

[21] Appl. No.: 452,703

[52] U.S. Cl. .............................. 134/134; 34/109; 62/381; 134/159; 165/169; 221/254; 222/342; 259/10
[51] Int. Cl.² .......................................... B08B 3/00
[58] Field of Search .......... 134/133, 134, 159, 163; 259/9, 10, 25, 26, 45, 46; 34/109; 165/169; 62/63, 64, 373–376, 381; 198/33 AD; 222/220, 342; 221/254

[56] References Cited
UNITED STATES PATENTS

| | | | |
|---|---|---|---|
| 790,580 | 5/1905 | Kurtz | 134/134 |
| 1,432,578 | 10/1922 | Thomas et al. | 134/134 |
| 1,747,080 | 2/1930 | Reeh | 62/381 X |
| 2,441,376 | 5/1948 | Stiening | 62/381 X |
| 3,156,248 | 11/1964 | Rand | 134/134 |
| 3,664,146 | 5/1972 | Butts | 62/63 |
| 3,779,034 | 12/1973 | Morgan | 62/381 |

Primary Examiner—William E. Wayner
Assistant Examiner—Ronald C. Capossela
Attorney, Agent, or Firm—Robert W. Beach

[57] ABSTRACT

Processing chambers formed by circumferentially spaced pockets of a rotor rotatable in a cylindrical chamber disposed with its axis substantially horizontal are loaded through a top access opening in the cylinder and unloaded by a single or double vaned scoop rotatable about an axis parallel to the axis of the casing to sweep product out of an upwardly opening rotor pocket. The spider rotor and unloading rotor are power-driven intermittently so that the unloading rotor sweeps through a pocket of the spider rotor when the spider rotor is stationary, and the spider rotor is indexed to expose successive pockets to the access opening of the casing when the unloading rotor is out of the path of movement of the spider rotor partition vanes.

10 Claims, 8 Drawing Figures

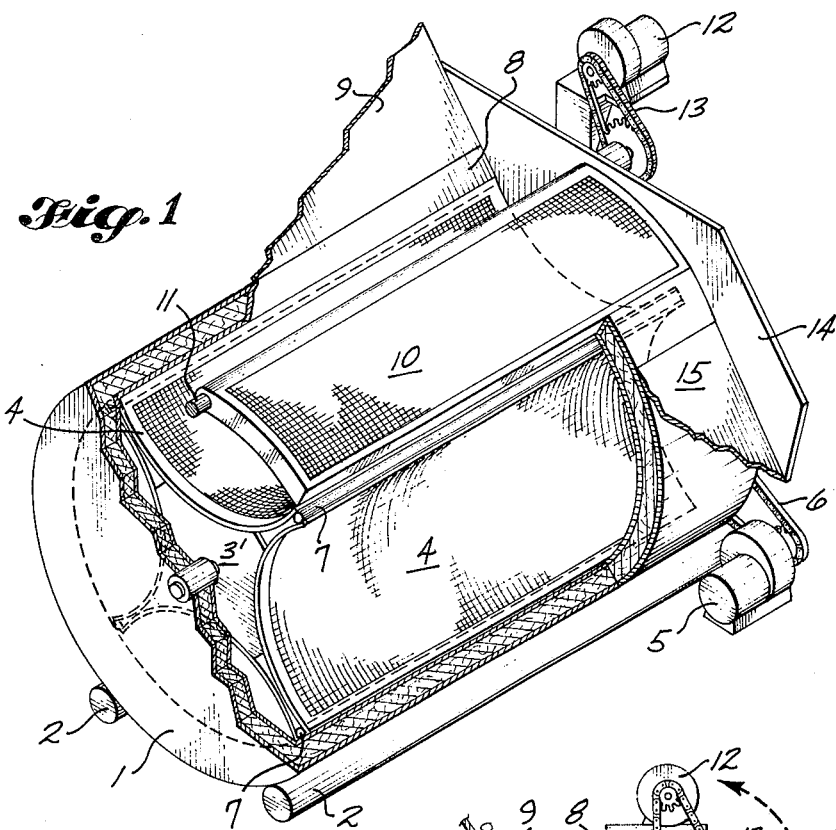
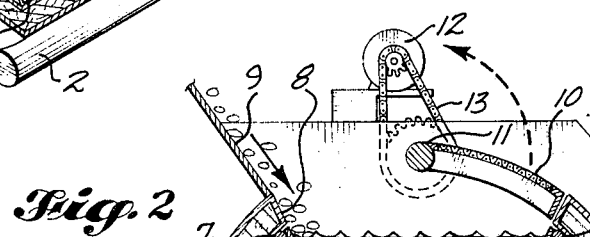
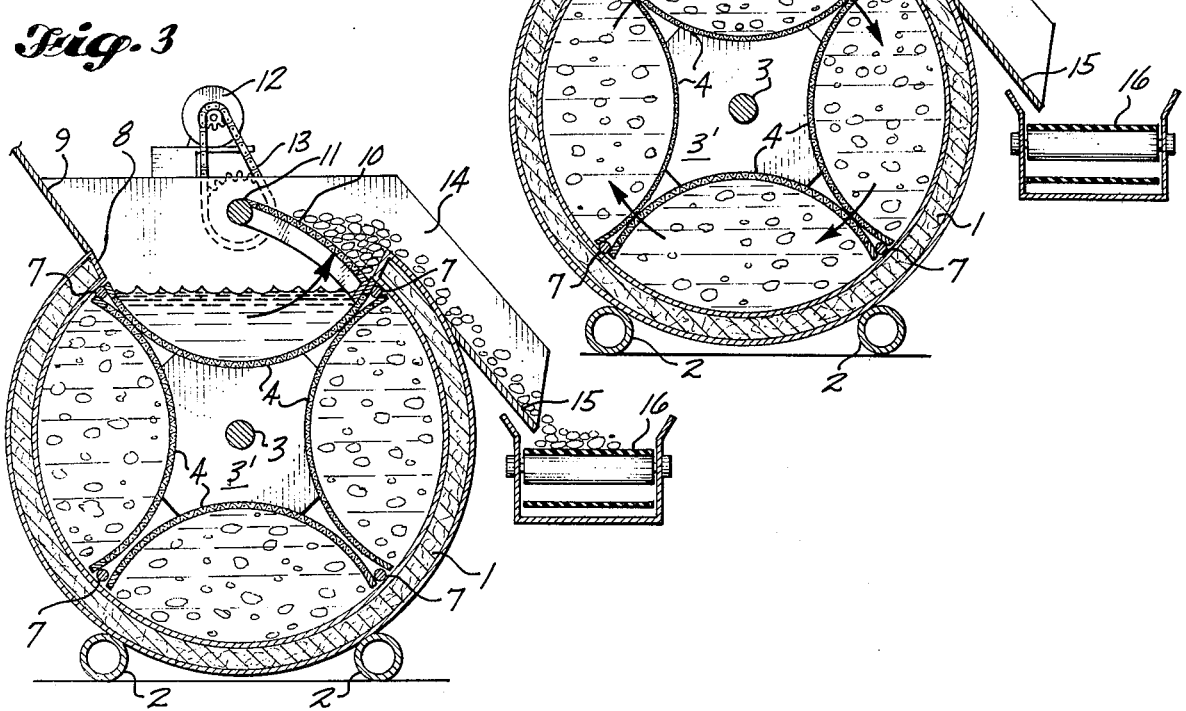

ROTARY PROCESSING APPARATUS

This invention relates to equipment for processing a product such as for quick-freezing it so as to require minimum manual handling of the product and to the process performed by such equipment.

A principal object of the invention is to be able to unload products automatically, quickly and completely from rotating batch-processing equipment.

It is also an object to be able to unload such batch processing equipment in a sanitary and gentle manner.

A further object is to provide batch-processing apparatus which can be used for processing a variety of products and apparatus by which products can be unloaded from the processing apparatus.

FIG. 1 is a top perspective of processing apparatus in accordance with the present invention, parts of which are broken away.

FIGS 2 and 3 are vertical transverse sections through the apparatus shown in FIG. 1 with parts in different positions.

Figure 4:
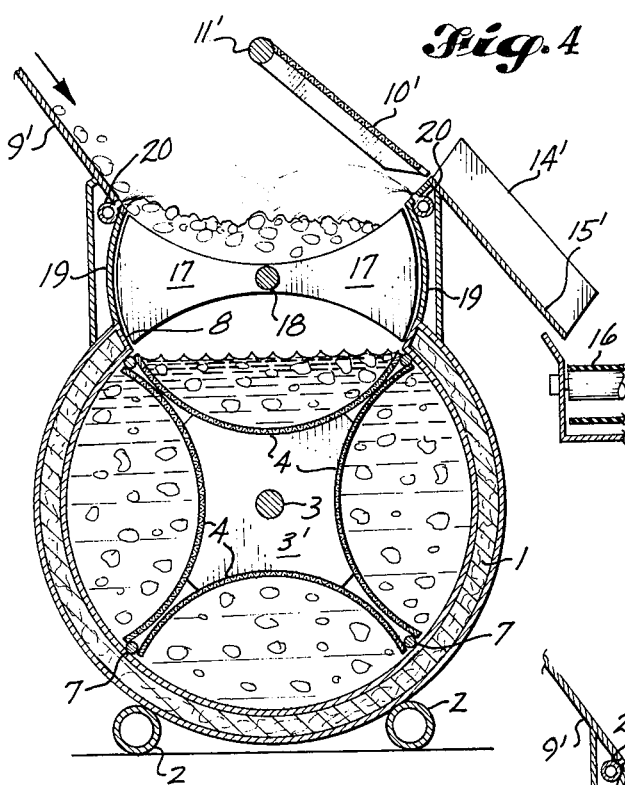
FIGS. 4, 5 and 6 are vertical transverse sections through processing apparatus of the same general type as shown in FIG. 1, but having modified unloading apparatus.

The processing apparatus to which the present invention applies could be used to perform various types of treatment, but it is particularly well adapted for quick-freezing products such as fish, vegetables or fruit. The apparatus could, however, be used for soaking products or heating products in a fluid medium. Whatever the nature of the processing, such processing is of the successive batch type. Use of the apparatus shown in the drawing will be described in connection with a quick-freezing process.

The casing 1 is of cylindrical shape, cradled on elongated spaced parallel supporting tubes 2 in a manner to dispose its axis substantially horizontally. Preferably the casing is insulated and is substantially filled with treating fluid. For freezing product such fluid may be liquid refrigerant or cold brine, which may be circulated through the interior of the casing. Product can be moved through the casing in batches by a spider rotor received within the casing and mounted on an axle 3 extending axially of the casing. The periphery of such rotor is formed by circumferentially spaced partitions 4 supported by end webs 3' from the axle 3 and dividing the rotor into circumferentially spaced pockets between the adjacent partitions, respectively. Each pocket is defined by an outwardly concave screen, preferably of cylindrically arcuate shape. The edge portions of these screens abut to form the partitions between the rotor pockets.

The rotor illustrated in the drawings is shown as having four pockets, which is the preferred number. Three pockets could be used, but in that case the treating fluid capacity of the casing would be reduced. If there were a greater number of pockets they would be undesirably shallow because the casing must be divided into sectors corresponding to the number of pockets, and the pocket radius is determined by the largest cylinder inscribable in such sector having its center at the location of the scooping rotor shaft. Such shallow pockets would result in wasted space at the core of the rotor and substantially limit the product processing capacity of the apparatus.

It is preferred that the spider rotor be power-rotated relative to the casing 1, such as by a motor 5 connected by a chain 6 to a drive sprocket on the axle 3. Such rotor can be rotated continually at slow speed during the processing of the product in the casing to effect relative movement between the product and the treating fluid. In a quick-freezing process such agitation of the refrigerant liquid deters formation of ice on the casing, but scraper bars 7 can be mounted on the outer edges of the rotor partitions 4 to scrape the inner wall of the casing 1 for removing any accumulation of ice from it. roto The pockets of the rotor between the adjacent partitions 4 can be loaded and unloaded through a top opening 8 in the casing 1. The width of such opening is approximately equal to the chordal width of each pocket. Rotation of the spider rotor is interrupted with a pocket bridging across the opening 8, as shown in FIGS. 2 and 3, during a pocket loading or unloading operation. Product is loaded into a rotor pocket in this position by movement down a supply chute 9 through the opening 8 as indicated in FIG. 2. After such a loading operation, the rotor can be indexed to bring the next pocket into position bridging across the top opening 8 of the cylindrical casing 1, or continuous rotation of the rotor within the casing for a period can simply be interrupted at a future time when it is desired to unload a rotor pocket.

As illustrated in FIG. 3, the pocket-unloading operation is accomplished by a rotary screen unloading vane 10 projecting from and carried by a rotatable shaft 11 extending parallel to the axis of the casing 1 and the rotor axle 3 and located above such axis and axle a distance greater than the radius of the spider rotor and at the center of curvature of a cylindrically arcuate screen forming a pocket bridging across the casing top opening 8. The closer shaft 11 is located to axle 3, the greater the radius of pockets, but shaft 11 must be located to clear the partitions between the pockets as the spider rotor turns. The rotor pocket-unloading operation is accomplished by swinging the unloading vane 10 by rotation of its supporting shaft 11 effected by motor 12 through a chain-and-sprocket drive 13 connecting such motor and shaft. Rotation of the unloading vane shaft will swing such unloading vane in a counterclockwise direction as seen in FIG. 3, so as to sweep downward through the access opening into the upper rotor pocket between the upper adjacent partitions 4 and scoop all product out of such pocket. By such operation the product is gently lifted from the rotor pocket and slides from the top of the pile on the scooping vane 10 down a discharge chute 14 as the pile is lifted progressively by upward swinging of the vane. The product can empty from the lower portion 15 of the chute onto a discharge conveyor 16.

When the scooping vane 10 has been swung into the position shown in FIG. 2, all of the product last scooped from a pocket of the rotor will have slid off such vane down the chute 14 to the conveyor 16. Swinging of the vane can then be interrupted either in that position or in any position rotated from that position through 180° until it is desired to use the vane for the next operation of unloading a rotor pocket. A new batch of product of predetermined quantity can be supplied through feed chute 9 at any time after the scooping vane 10 has moved in the counterclockwise direction as seen in FIGS. 2 and 3 past the edge of the casing opening 8 to which the feed chute 9 is connected. Time can be saved by thus supplying product to be processed to a rotor pocket at the same time that the vane 10 is sweeping the previous batch of product out of the same pocket.

The scooping ranch 10 is made of screen, that is either perforated plate or meshed wire, so that processing liquid will drain from the product being scooped out of the liquid through the vane and back into the tank 1 during the unloading operation. In order to locate shaft 11 as close as possible to axle 3, it is preferred that the vane 10 be curved to the same degree as casing 1 so that the vane clears the rotor partitions when the vane is in the position of FIG. 2. After the unloading operation is completed, the spider rotor is again rotated by motor 5 through an angle at least equal to the circumferential extent of a pocket and at some subsequent time rotation of the rotor is interrupted with another pocket bridging the casing opening 8 to be emptied of product and refilled.

Figure 5:
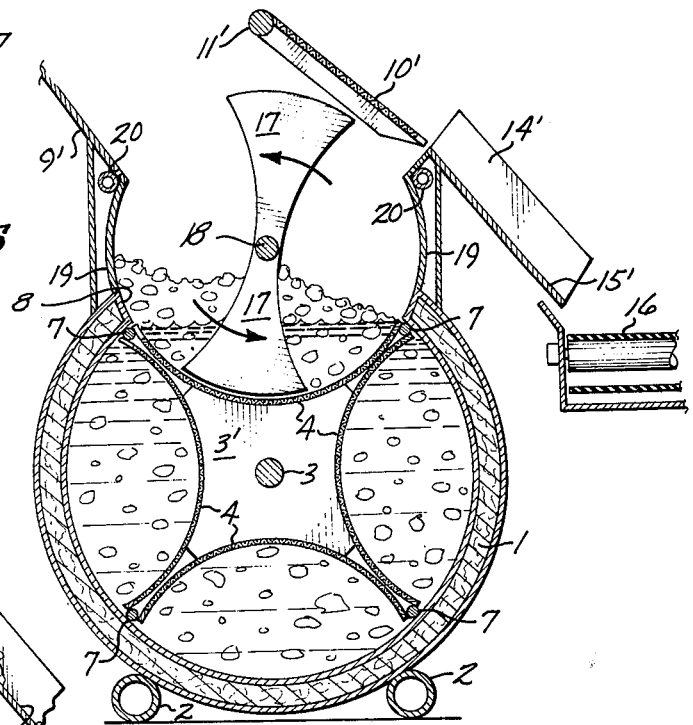
Figure 6:
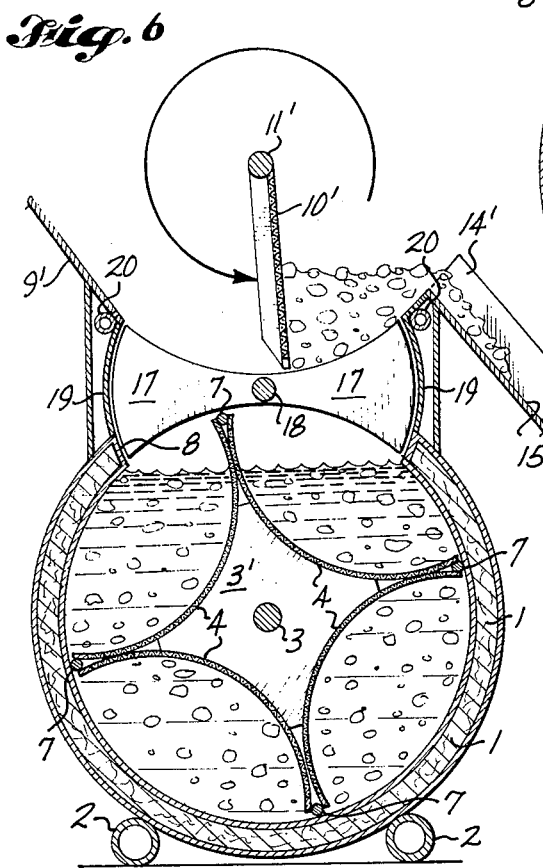

In the modified apparatus shown in FIGS. 4, 5 and 6, a double vane pocket-unloading scoop is provided instead of the single vane scoop 10 shown in FIGS. 1, 2 and 3. The double vane scoop of FIGS. 4, 5 and 6 includes two vanes 17 projecting diametrically oppositely from a shaft 18 on which they are mounted. Each vane 17 is flared in cross section away from shaft 18, and its opposite sides are curved concavely so that the curved sides of the two vanes meet in a smooth curve adjacent to the shaft 18. The opposite sides of the double vane scooping rotor are thus concave so that the entire rotor is of biconcave configuration.

The total width of the double vane scooping rotor corresponds generally to the width of the top opening 8 of casing 1. The outer edges of the two scooping vanes 17 are of cylindrically arcuate shape concentric with the axis of rotor mounting shaft 18. These convex rotor vane edges fit closely adjacent to complementally cylindrically concave throat surfaces 19. Such concave surfaces are concentric with the axis of shaft 18 and on substantially the same radius as the concave curvature of the upper rotor pocket screen 4.

The concave curvature of each side of the double vane scooping rotor is of substantially the same radius as the radius of the inner wall of the processing drum casing 1. When the vanes 17 of the unloading rotor are horizontal therefore, as shown in FIGS. 4 and 6, the edges of the pocket-forming rotor vanes will move closely adjacent to the lower side of the unloading rotor as shown in FIG. 6 or gently touch it. With the construction shown in FIGS. 4, 5 and 6, therefore, the access opening 8 is virtually sealed when the rotor vanes are in their horizontal position shown in FIGS. 4 and 6.

In order to unload a pocket of the processing tank rotor the unloading rotor vanes 17 are swung in the counterclockwise direction, as shown in FIG. 5, from the horizontal position of FIG. 4. The downwardly moving vane will sweep the product from the upper pocket of the rotor in the manner generally described in connection with FIGS. 2 and 3. In this instance, however, instead of the product being lifted so that the top of the product pile will slide down a discharge chute, the product will be scooped by the upper concave face of the upwardly moving vane 17 to lift the product alongside a throat surface 19.

When the unloading rotor has completed its rotation back to the position shown in FIGS. 4 and 6, in which its vanes 17 are horizontal, the product scooped out of the upper rotor pocket will be carried by the unloading rotor in the trough formed by its then upper concave surface. In order to refill the upper pocket of the processing tank rotor at the same time that treated product is thus swept out of such pocket, a fresh charge of product will be supplied to such pocket behind the vane of the scooping rotor which is effecting the unloading operation. Supplying of such new charge can be expedited by supplying the fresh charge of product to the upper side of the unloading rotor in the horizontal position shown in FIG. 4.

Prior to the combined unloading and loading operation the new product carried by the unloading rotor can be dampened with refrigerant projected onto it from spray pipes 20 as shown in FIG. 4. When the unloading rotor is turned over through 180°, the new charge will be dumped from the upper side of the unloading rotor into one side of the processing rotor pocket simultaneously with the lower vane of the rotor sweeping the processed product out of the opposite side of the processing rotor pocket as shown in FIG. 5. As the unloading rotor vane is moved out of such pocket, the new charge will be pressed into the pocket to the extent necessary by the upper vane of the rotor moving from the position shown in FIG. 5 downward into the position of FIG. 6.

After the unloading rotor has been fully inverted from the position shown in FIG. 4 to that of FIG. 6 by rotation of shaft 18 through 180°, the processed product can be swept out of the upper trough of the unloading rotor carried by shaft 18 by a secondary unloading rotor including a single vane 10' mounted on and projecting radially from an upper shaft 11'. Such shaft is mounted concentrically with the concave curvature of the upper side of the principal unloading rotor when its vanes 17 are horizontal as shown in FIGS. 4 and 6. The radial length of vane 10' is substantially equal to the radius of the cylindrically concave upper surface of the primary unloading rotor.

At any time prior to a fresh charge of product being delivered to the upper side of the main unloading rotor down feed chute 9', the secondary unloading rotor shaft 11' can be rotated in a counterclockwise direction, so that the free edge of the secondary unloading rotor vane 10' will sweep the processed product off the upper side of the main unloading rotor, as illustrated in FIG. 6. As the processed product is swept to the right as seen in that figure, the upper portion of the pile will slide down unloading trough 14' and be discharged from its lower portion 15' onto the discharge conveyor 16. At the completion of such secondary scooping operation, rotation of the secondary unloading rotor shaft 11' will be interrupted in a position such as shown in FIG. 5 out of the path of rotation of the principal scooping vanes 17 until after shaft 18 has been rotated again through 180° to accomplish the next operation of unloading a pocket of the processing tank rotor and reloading such pocket.

Figure 7:
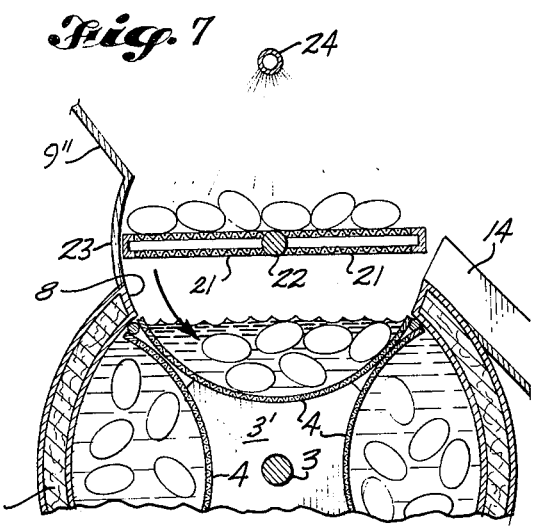
FIGS. 7 and 8 are vertical transverse sections through apparatus generally like that shown in FIG. 1, but having a further modified type of unloading apparatus.
Figure 8:
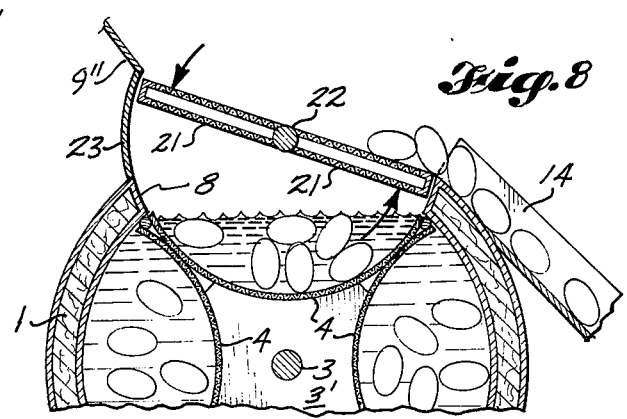

It is not necessary for a double vane scooping rotor to be of biconcave shape, at least for product of some types. In FIGS. 7 and 8 a double vane unloading rotor is shown including two vanes 21 projecting oppositely from a shaft 22. Each of these vanes is of double screen construction. The product being handled by this apparatus is represented as being roundfish. The operation of this mechanism is generally similar to that described in connection with FIGS. 4, 5 and 6, except that it is not necessary for this mechanism to have a secondary unloading or scooping rotor.

When the scooping vanes 21 are at rest in their horizontal positions of FIG. 7, a charge of fish or other product to be processed can be delivered down feed chute 9″ to the upper side of the rotor. Such product should be delivered to the rotor with insufficient velocity to slide across the rotor and fall off the edge remote from the feed chute. The product will not slide off the edge of such rotor adjacent to the feed chute even though it should pile up on that edge, because such edge of the rotor is located closely adjacent to an arcuate wall 23 joining the lower end of the feed chute 9″ and the corresponding edge of the top opening 8 of the processing tank 1.

While the fish lie on the upper sides of the vanes 21, they can be treated preliminarily, such as by being initially chilled or flash-frozen by refrigerant liquid sprayed onto such product from an overhead perforated spray pipe 24. Any excess of such sprayed refrigerant will pass between the product and through the screen vanes 21 into tank 1.

When a partitioning screen 4 of the spider rotor in the processing tank 1 has been moved into a position bridging across the access opening 8 of the tank, as shown in FIG. 7, and the spider rotor has been stopped, shaft 22 can be rotated through a half revolution in a counterclockwise direction as seen in FIG. 7, which is indicated by the arrow. As the left vane 21 swings downward it will scoop product from the upper pocket of the spider rotor, and the fresh charge of product to be processed will slide against wall 23 as the scooping rotor tilts and be deposited into the upper pocket of the spider rotor as the treated charge of product is swept out of such pocket. As the scooping vane moves upward, the treated product will be lifted over the right edge of the tank access opening 8 and slide down discharge chute 14 for removal by a discharge conveyor as described in connection with FIGS. 2 and 3.

By the time the unloading rotor has reached the position shown in FIG. 8, all the product should have slid off the upper surface of the right vane 21 into the discharge chute 14. It may, however, be necessary to arrest movement of the unloading rotor in this position momentarily so as to complete the discharge of product into the chute. Rotation of the unloading rotor will then be resumed until the vanes 21 again reach the horizontal position shown in FIG. 7. The spider rotor in the treating tank 1 can then again be rotated to index the rotor to the next pocket or rotation of the rotor may be continued for a predetermined period of time before the scooping rotor is again operated to scoop out treated product from another pocket of the spider rotor and to reload such pocket with a fresh charge of product to be treated.

Resumption of rotation of the spider in the treatment tank should be delayed until the flat vane 21 has been moved into the horizontal position of FIG. 7, because prior to that time the right vane of the unloading rotor might be in the path of movement of a partition of the spider rotor. To avoid such delay, it would be possible to make the vanes 21 of curved shape like the single vanes 10 shown in FIGS. 2 and 3. The unloading rotor would then have a cross section of ogee shape. With such a construction, turning of the spider rotor could be resumed as soon as the edge of the right unloading rotor vane had reached the right edge of the top access opening 8 of the casing even though the unloading rotor were stopped in that position until it had been unloaded completely. The unloading rotor could rest in its discharge position of FIG. 8 until the next unloading operation. In that case instead of the fresh charge of product being deposited on the upper side of the unloading rotor as shown in FIG. 7, such charge could be delivered by feed chute 9″ during actual rotation of the unloading rotor from a position in which its vanes are horizontal through approximately one-third of a revolution prior to the vane above shaft 22 coming into too close proximity to the feed chute 9‴.

I claim:

1. Processing apparatus comprising a processing chamber having an upper access opening, a spider rotor mounted for rotation about a generally horizontal axis and having a plurality of radiating partitions dividing said rotor into a plurality of circumferentially spaced pockets between adjacent partitions, respectively, the outer edges of said partitions being movable through an orbit by rotation of said rotor, product-unloading means guided for movement downward along a path crossing the upper portion of the orbit of said partition edges and through said access opening, and means for rotating said spider rotor and for positioning said spider rotor with adjacent partitions thereof located at opposite sides of that portion of the path of said pocket-unloading means crossing the upper portion of the orbit of said partition edges for movement of said product-unloading means between said adjacent partitions into the pocket of said rotor therebetween in registration with said access opening to unload product from such rotor pocket through said access opening.

2. The apparatus defined in claim 1, in which each spider rotor pocket has a concave wall and the pocket-unloading means includes a vane guided to sweep along such concave wall of a rotor pocket.

3. the apparatus defined in claim 1, in which the rotor pockets are of concave substantially cylindrically segmental shape, and mounting means mounting the product-unloading means for rotation about an axis substantially coinciding with the axis of curvature of the rotor pocket open to the processing chamber access opening.

4. The apparatus defined in claim 3, in which the product-unloading means includes a vane carried by the mounting means.

5. The apparatus defined in claim 4, in which the vane is a screen.

6. The apparatus defined in claim 3, in which the product-unloading means includes two vanes projecting oppositely from the mounting means.

7. The apparatus defined in claim 6, in which the product-unloading means is a biconcave rotor.

8. The apparatus defined in claim 7, and secondary product-unloading means operable to unload product from the upper side of the biconcave rotor.

9. The apparatus defined in claim 6, and supply means for supplying a fresh charge of product to be processed to the upper side of the vanes.

10. The apparatus defined in claim 9, and spray means for spraying the fresh charge of product with treating liquid.

* * * * *